United States Patent
Shipps et al.

(10) Patent No.: US 11,885,663 B2
(45) Date of Patent: Jan. 30, 2024

(54) FLOWMETER CALIBRATION SYSTEM AND METHOD

(71) Applicant: Endress+Hauser Flowtec AG, Reinach (CH)

(72) Inventors: Kyle Shipps, Indianapolis, IN (US); Jerry E. Stevens, Brownsburg, IN (US)

(73) Assignee: Endress+Hauser Flowtec AG, Reinach (CH)

(*) Notice: Subject to any disclaimer, the term of this patent is extended or adjusted under 35 U.S.C. 154(b) by 0 days.

(21) Appl. No.: 17/645,780

(22) Filed: Dec. 23, 2021

(65) Prior Publication Data

US 2022/0196455 A1 Jun. 23, 2022

Related U.S. Application Data

(60) Provisional application No. 63/129,786, filed on Dec. 23, 2020.

(51) Int. Cl.
*G01F 25/10* (2022.01)
*G01F 1/84* (2006.01)
*G01F 15/00* (2006.01)

(52) U.S. Cl.
CPC .............. *G01F 25/14* (2022.01); *G01F 1/84* (2013.01); *G01F 15/005* (2013.01)

(58) Field of Classification Search
None
See application file for complete search history.

(56) References Cited

U.S. PATENT DOCUMENTS

| | | |
|---|---|---|
| 6,360,579 B1 | 3/2002 | De Boom et al. |
| 6,782,333 B2 | 8/2004 | Baker et al. |

(Continued)

FOREIGN PATENT DOCUMENTS

| | | |
|---|---|---|
| WO | 02097379 A1 | 12/2002 |
| WO | 2012161922 A1 | 11/2012 |

OTHER PUBLICATIONS

Pope, Jodie G., et al., NIST's Fully Dynamic Gravimetric Liquid Flowmeter Standard, 9th ISFFM, Apr. 2015, pp. 15.

(Continued)

*Primary Examiner* — Paul M. West
*Assistant Examiner* — Mark A Shabman
(74) *Attorney, Agent, or Firm* — Christopher R. Powers; Endress+Hauser (USA) Holding, Inc.

(57) ABSTRACT

A calibration system and methods for flow metering technologies integrates a known primary reference standard (e.g., a gravimetric scale), configured to determine a mass of calibration fluid, in parallel with surrogate secondary masters (e.g., Coriolis effect flowmeters) connected via an adjustable flowpath having a closed loop mode, including a meter bank, a pump and a measuring section, and an open loop mode, including a reservoir, the meter bank, the pump, the measuring section and the primary reference standard, which enables calibration duality and redundant meter under test confirmation of calibration factors. The disclosed systems and methods enable life cycle assurance of the primary reference standard and the secondary masters' standard reliability and reproducibility over time and, as a redundant system, enable calibration of multiple flow metering technologies, such as, for example, volumetric, mass, density, viscosity and Reynolds number-reliant technologies, in one homogenous system.

9 Claims, 3 Drawing Sheets

(56) References Cited

U.S. PATENT DOCUMENTS

| | | | |
|---|---|---|---|
| 6,826,521 B1 * | 11/2004 | Hess | G05B 13/048 |
| | | | 703/12 |
| 7,287,434 B2 | 10/2007 | Tison et al. | |
| 2004/0216509 A1 | 11/2004 | Antonijevic | |
| 2015/0226597 A1 * | 8/2015 | Gaspard, Jr. | G01F 25/13 |
| | | | 73/1.16 |
| 2018/0209831 A1 * | 7/2018 | Rensing | G01F 1/849 |
| 2018/0266864 A1 * | 9/2018 | Rensing | G01F 25/10 |

OTHER PUBLICATIONS

Recommended Standard Operating Procedure for Gravimetric Calibration of Volumetric Standard Using an Electronic Balance, SOP No. 14, NIST, https://doi.org/10.6028/NIST.IR.7383-2019.

* cited by examiner

FLOWMETER CALIBRATION SYSTEM AND METHOD

TECHNICAL FIELD

The present disclosure generally relates to calibration systems and methods for flow metering technologies.

BACKGROUND

Methods for testing and/or calibrating a measuring instrument to measure a physical parameter of a fluid generally include: performing a plurality of valid test runs, wherein a valid test run includes; exposing the device under test (i.e., unit under test) and a reference measuring instrument to the fluid and its conditions; obtaining a reference value for the physical parameter of interest from the reference measuring instrument; and obtaining a test value for the physical parameter from the device under test; and evaluating a plurality of such test values originating from the plurality of valid test runs with respect to at least one of accuracy, repeatability and reproducibility. Testing may be governed by specific industry standards, e.g., the American Petroleum Institute's (API) MPSM, Chapter 4.8 for the operation of proving systems, which is predominantly intended for operating meter provers on single-phase liquid hydrocarbons. Other recognized standards organization include the International Organization of Legal Metrology (OIML), the National Institute of Standards and Technology (NIST) and any of various national measurement institutes, such as the Netherlands Measurement Institute (NMi).

Testing and/or calibration generally occurs under a set of influences, which could have an adverse effect on the test results, as well as with respect to repeatability and reproducibility as with respect to accuracy. Singular calibration systems for flow metering technologies based solely on gravimetric or master meter concepts can be limited in accuracy, uncertainty, repeatability, reproducibility, linearity or rangeability. These limitations can impact calibration factors for units under test or factors required by industry for optimum performance. Singular calibration systems lack redundancy to a primary standard and can be subject to undetected drift between formal calibration intervals. Drift may not be detected until normal surveillance actions are performed as mandated under quality programs or performance requirements needed for third party agency conformance. Accordingly, there remains a need for further contributions in this area of technology.

SUMMARY

In one aspect of the present disclosure, a calibration system for calibrating a flowmeter device under test includes: a meter bank comprising a plurality of flowmeter banks, each flowmeter bank including at least a first meter and a second meter in series, wherein the first meter and the second meter are flowmeters each configured to determine a flow measurement value; a reservoir configured to contain and selectively supply a calibration fluid to the meter bank and remainder of the system; a pump configured to pressurize the calibration and/or convey the calibration fluid through the system at a desired flow rate; a measuring section configured to reversibly accept and retain a device under test in fluid communication with the meter bank; a primary reference standard configured to determine a mass of calibration fluid, wherein the reservoir, the meter bank, the pump, the measuring section and the primary reference standard are fluidically connected via flow lines as to define an adjustable flowpath, wherein a closed loop mode the flowpath includes the meter bank, the pump and the measuring section, and wherein in an open loop mode the flowpath includes the reservoir, the meter bank, the pump, the measuring section and the primary reference standard; and a diverter valve configured to selectively switch the flowpath between the open loop mode and the closed loop mode.

In at least one embodiment, the first meter and the second meter of each flowmeter bank are of a same type of flowmeter, and the first meter and the second meter each operate to an uncertainty no greater than 0.030% of the flow measurement value. In a further such embodiment, the first meter and the second meter of each flowmeter bank have the same or nearly the same flow capacity. In certain embodiments, the first meter and the second meter of each flowmeter bank are Coriolis flowmeters, wherein an uncertainty of each flowmeter bank at an average flow rate of 12 kg/s is no more than 0.0036 kg/s. In certain embodiments, the first meter, second meter and the primary reference standard are selected as to enable flow measurements that are at least three times more accurate than the DUT 16 with at least 95% certainty.

In at least one embodiment, the primary reference standard includes a gravimetric scale including a collection tank and a weigh scale. In a further such embodiment, the primary reference standard includes an isolation drain. In at least one embodiment, the calibration system includes a controller configured to communicate with the meter bank, device under test and/or primary reference standard to receive and operate upon measurement signals representing measured values therefrom. In a further such embodiment, the controller includes a flow computer and a transmitter associated with each first meter and second meter of each flowmeter bank.

In another aspect of the present disclosure, a method of calibrating a flowmeter device under test includes: establishing a steady state flow of a calibration fluid through a flowpath of a calibration rig comprising at least one bank of flowmeters including one or more flowmeters; switching the calibration rig to an open loop mode for a period, wherein in the open loop mode the flowpath includes a primary reference standard such that calibration fluid flowing through the at least one bank of flowmeters during the period flows into the primary standard; measuring a first flow rate of the calibration fluid through the at least one bank of flowmeters during the period; determining a second flow rate of the calibration fluid based on the mass of calibration fluid that flows into the primary reference standard during the period; comparing the first flow rate and second flow rate to determine an accuracy of each flowmeter of the at least one bank of flowmeters; when the accuracy of the one or more of the flowmeters of the at least one bank of flowmeters does not meet a first maximum uncertainty requirement, calibrating the one or more of the flowmeters relative to the second flow rate; switching the calibration rig to a closed loop mode, wherein in the closed loop mode the flowpath includes the at least one bank of flowmeters and the device under test and does not include the primary reference standard such that calibration fluid flowing through the at least one bank of flowmeters and the device under test does not flow into the primary reference standard; establishing a steady state flow of the calibration fluid through the flowpath of the closed loop mode; measuring a third flow rate of the calibration fluid through the device under test; comparing the first flow rate and the third flow rate to determine an accuracy of the device under test; and when the accuracy of the device under test does not meet a second maximum uncertainty requirement, calibrating the device under test relative to the first flow rate.

In at least one embodiment, concurrently or near in time with measuring the third flow rate, an updated first flow rate is measured through the at least one bank of flowmeters; the third flow rate is compared to the updated first flow rate to determine an accuracy of the device under test; and when the accuracy of the device under test does not meet the second maximum uncertainty requirement, the device under test is calibrated relative to the updated first flow rate.

In at least one embodiment, the method further includes verifying the accuracy of the at least one bank of flowmeters, wherein the verifying includes: establishing a steady state flow of the calibration fluid through the flowpath in the closed loop mode; switching the calibration rig to the open loop mode for a second period such that calibration fluid flowing through the at least one bank of flowmeters during the second period flows into the primary standard; measuring a fourth flow rate of the calibration fluid through the at least one bank of flowmeters during the second period; determining a fifth flow rate of the calibration fluid based on the mass of calibration fluid that flows into the primary reference standard during the second period; comparing the fourth flow rate and fifth flow rate to determine an accuracy of each flowmeter of the at least one bank of flowmeters; and when the accuracy of the one or more of the flowmeters of the at least one bank of flowmeters does not meet the first maximum uncertainty requirement, recalibrating the one or more of the flowmeters relative to the fifth flow rate. In a further such embodiment, the method includes, when the one or more of the flowmeters are recalibrated relative to the fifth flow rate, verifying the accuracy of the device under test, wherein the verifying includes: establishing a steady state flow of the calibration fluid through the flowpath in the closed loop mode; measuring a sixth flow rate of the calibration fluid through the device under test; concurrently or near in time with measuring the sixth flow rate, an updated fourth flow rate is measured through the at least one bank of flowmeters; the sixth flow rate is compared to the updated fourth flow rate to determine a new accuracy of the device under test; and when the new accuracy of the device under test does not meet the second maximum uncertainty requirement, the device under test is calibrated relative to the updated fourth flow rate.

In at least one embodiment, the method further includes installing the device under test into a measuring section of the calibration rig before or after measuring a first flow rate of the calibration fluid through the at least one bank of flowmeters during the period, wherein the measuring section is in the flowpath downstream of the at least one bank of flowmeters and upstream of the primary reference standard. In certain embodiments, the at least one bank of flowmeters includes a first flowmeter and a second flowmeter in series. In further embodiments, the at least one bank of flowmeters includes plurality of banks, each in parallel with the others. In still further embodiments, the calibration rig includes a controller configured to perform the method, including: to communicate with the at least one bank of flowmeters, device under test and/or primary reference standard to receive and operate upon measurement signals representing measured values therefrom; and to control a diverter valve by which the calibration rig is switched between the closed loop mode and the open loop mode.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure includes various embodiments of a calibration system (e.g., a calibration rig) for flow metering technologies and methods for using and constructing the same. The present disclosure further discloses various embodiments of a calibration system integrating a known primary reference standard (e.g., a gravimetric scale) in parallel with surrogate secondary masters (e.g., Coriolis effect flowmeters), enabling calibration duality and redundant meter under test confirmation of calibration factors. The disclosed systems and methods enable life cycle assurance of the primary reference standard and the secondary masters' standard reliability and reproducibility over time and, as a redundant system, enable calibration of multiple flow metering technologies, such as, for example, volumetric, mass, density, viscosity and Reynolds number-reliant technologies, in one homogenous system.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
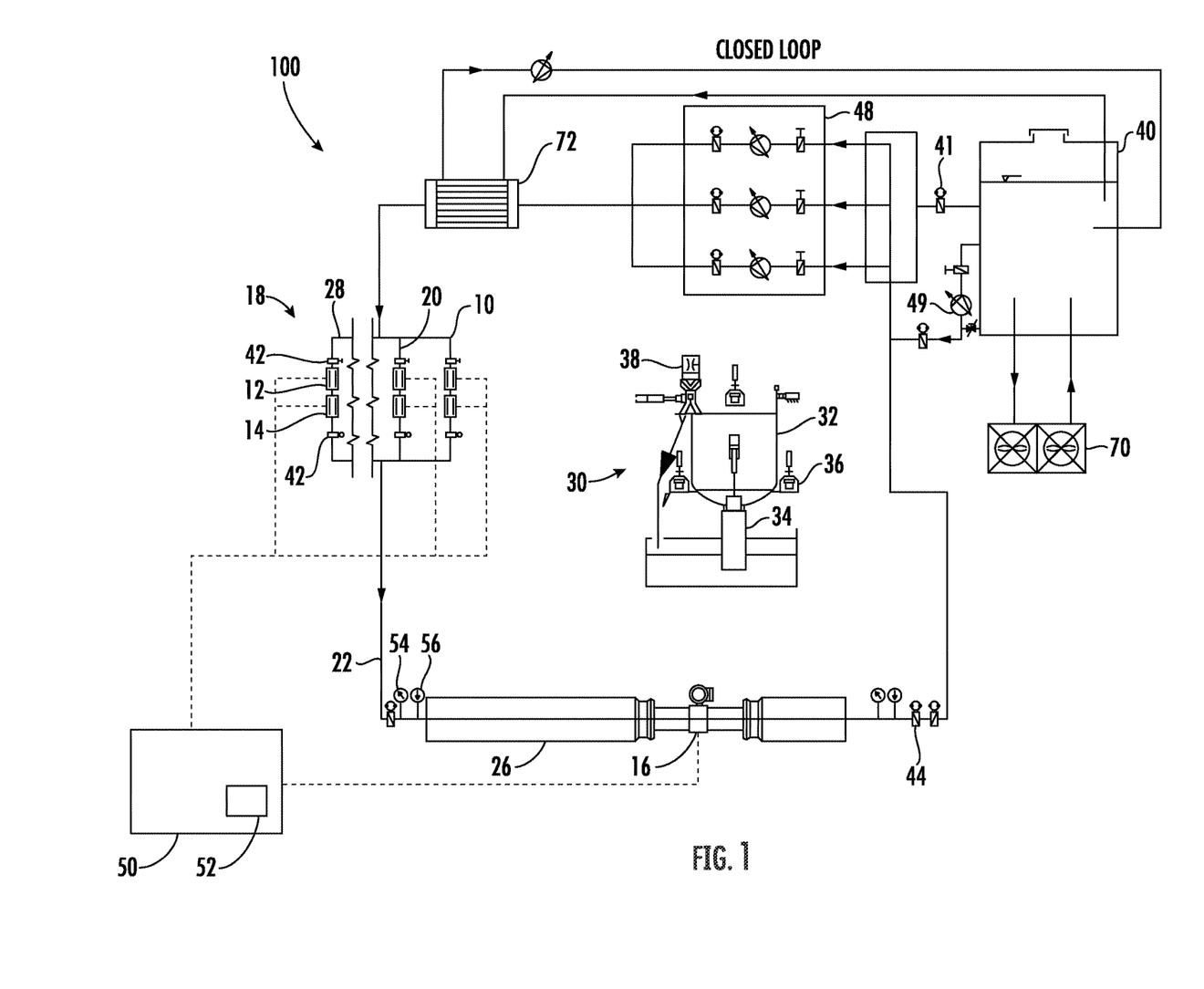
FIG. 1 shows schematic of an embodiment of a calibration system according to the present disclosure in a closed loop mode.
Figure 2:
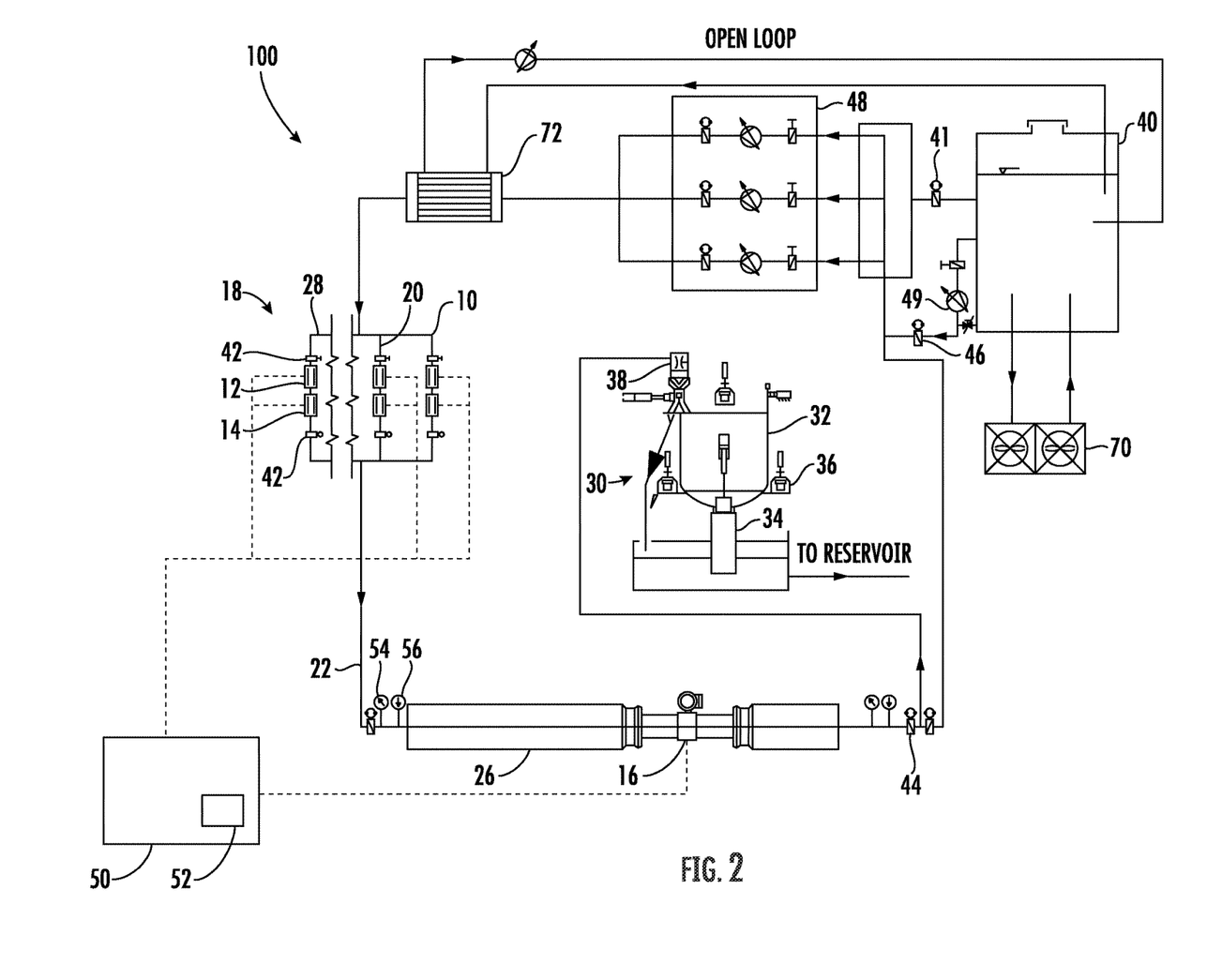
FIG. 2 shows schematic of an embodiment of a calibration system according to the present disclosure in an open loop mode.

FIGS. 1 and 2 show, according to at least one embodiment of the present disclosure, a calibration system 100 configured to determine the accuracy, repeatability and reproducibility of a device under test (DUT) 16 and to enable calibration of the DUT 16. As shown in FIGS. 1 and 2, the calibration system 100 defines a variable flowpath 22 including flow lines operable to convey a calibration fluid through the calibration system 100 and between the components of the calibration system 100. The calibration system 100 may include a meter bank 18 including one or more banks of flowmeters, including a first bank 10. Each bank of flowmeters may include at least two flowmeters in series with each other, a first meter 12 and a second meter 14. Because the first meter 12 is in series with the second meter 14, combining flow rate measurements from each provides an average flow rate having a lower statistical uncertainty than using a single meter in each bank.

In at least one embodiment of the present disclosure, the meter bank 18 may include a plurality of banks of flowmeters arranged in parallel to each other, including the first bank 10, a second bank 20 and additional banks 28, each having a first meter 12 and a second meter 14. In certain embodiments, each bank may include more than two flowmeters, each in series with the others. Each bank of the meter bank 18 may include valves 42 immediately upstream of the first meter 12 and downstream of the second meter 14 as to enable any individual bank or multiple banks of the meter bank 18 to be selectively included in the flowpath 22 with the DUT 16. For example, for testing and calibration of DUTs having relatively high full range flow capacities, the calibration system 100 must be operable to provide relatively high flow rates therethrough. In such embodiments, the meter bank 18 can be configured with a sufficient number of banks 28 of the plurality of banks to provide adequate throughput to test and calibrate the DUT 16 to a specified accuracy. In such an embodiment, the flow rate through the meter bank 18 is the sum total of the flow rates measured through the selected banks of the plurality of banks.

The first meter 12 and second meter 14 (and additional flowmeters in such embodiments) may be similarly constructed, high-accuracy flowmeters having the same or nearly the same flow capacity and measurement range at which the flowmeters have a specified measurement sensitivity and uncertainty. Each of the first and second meters 12, 14 may include a flow sensor and a signal transmitter configured to receive a measurement signal generated by the flow sensor and translate the measurement signal into a measured value (e.g., mass flow rate, density, viscosity, etc.). The transmitter may include control, computing (e.g., processor) and communication electronics configured to control the sensor and other components of the flowmeter, to determine measurement values and to provide the measurement signals and/or measured values to a control system or network.

In at least one embodiment, each of the first and second meters 12, 14 may be Coriolis effect mass flowmeters. As known to those skilled in the art, Coriolis effect mass flowmeters are a very accurate type of meter known for practical use through many flow regimes. Such flowmeters are generally independent of the physical fluid properties and flow profile and are capable of simultaneously measuring mass flow, density, viscosity and temperature of a fluid. In at least one embodiment, the first and second meters 12, 14 may be master meters that have been calibrated to a primary reference standard. The calibration system 100 enables the first and second meters 12, 14 to be periodically, regularly and selectively calibrated to a primary reference standard 30 of the calibration system 100, thereby qualifying the first and second meters 12, 14 as master meters. In at least one embodiment, each of the first and second meters 12, 14 may operate to an uncertainty no greater than 0.030% of the flow measurement value. Consequently, in embodiments in which each of the plurality of banks 28 includes two meters with such uncertainty (e.g., the first meter 12 and the second meter 14), the expanded uncertainty of each bank 10, 20, 28 at an average flow rate through the system 100 of 12 kg/s is no more than 0.0036 kg/s. In certain embodiments, the first and second meters 12, 14 and the primary reference standard 30 may be selected to enable flow measurements that are at least three times more accurate than the DUT 16 with at least 95% certainty. In further embodiments, the first and second meters 12, 14 are selected to enable simultaneous determination of mass flow rate, volume flow rate, density, viscosity and Reynolds number (Re) of the calibration fluid. Such flowmeters are manufactured by the Endress+Hauser® group (Applicant). In certain embodiments, the first and second meters 12, 14 may be selected to enable transferability of a calibration of the DUT 16 using water as the calibration fluid to other fluids using factors. For example, Applicant's product line of ProMass Q® is capable of such transferability.

In at least one embodiment, the meter bank 18 of the calibration system 100 may include 10 banks for flowmeters, each including a first meter 12 and a second meter 14. In such an embodiment, the first bank 10 may include flowmeters of relatively small flow capacity such as, by way of nonlimiting example, DN25, and the second bank 20 may include flowmeters of larger flow capacity such as, by way of nonlimiting example, DN50. In such an embodiment, the third through tenth banks 28 of the meter bank 18 may include meters of the same capacity as the second bank 20, DN50, for example. Such an embodiment enables the calibration system 100 to operate with a minimum of uncertainty over a relatively large range of flow rates, thereby enabling the calibration system 100 to test and calibrate DUTs having a large range of capacities such as, for example, 0.5 L/s to 100 L/s.

The calibration system 100 may include a pump module 48 in the flowpath 22 configured to control flow of the calibration fluid through and to set and maintain a system pressure of the calibration system 100. In at least one embodiment, the pump module 48 may be disposed upstream of the meter bank 18, fluidically connected by the flowpath 22. In an alternative embodiment, the pump module 48 may be disposed downstream of the meter bank 18. The pump module 48 may include one or more pumps in fluid communication with the meter bank 18 and the DUT 16. The pump module 48 may include at least one frequency-controlled variable speed pump. The pump module 48 may include at least one pressure-controlled, zero-flow pump adapted to generate a desired pressure in the flowpath 22. In at least one embodiment, the pump module 48 may include three variable speed pumps as shown in FIGS. 1 and 2. In such an embodiment, the pumps of the pump module 48 may have the same or different flow capacities. For example, the pump module 48 may include one pump with a minimum flow capacity (e.g., 10 L/s) and two pumps having greater maximum flow capacities (e.g., 50 L/s). In at least one embodiment, the pump module 48 includes a pressure controlled, zero-flow pump configured to generate the desired system pressure. The pump module 48 may further include valves immediately upstream and downstream of each pump to selectively included each pump of the pump module 48 in the flowpath 22, respectively. The pump module 48 may include one or more control valves configured to control the flow of calibration fluid through the flowpath 22.

As shown in FIGS. 1 and 2, the calibration system 100 may include a primary reference standard 30. A reference standard for a unit of measurement is an artifact that embodies the quantity of interest in a way that ties its value to a reference base. A primary reference standard is assigned a value by direct comparison with the reference base, for example, a known mass. In at least one embodiment, the primary reference standard 30 may be a gravimetric scale, which may include a collection tank 32 suitable for temporarily containing and holding the calibration fluid, a drain 34 configured to selectively retain or drain the calibration fluid from the collection tank 32, and a weigh scale 36 (e.g., balance) adapted to determine a mass of the calibration fluid in the collection tank 32. The collection tank 32 may be seated upon the gravimetric scale 36, which is operable to measure a tare weight of the collection tank 32 when empty and a gross weight of the collection tank 32 with calibration fluid during testing of the DUT 16. The drain 34 may be an isolation drain configured to prevent a load on the weigh scale 36. In at least one embodiment of the present disclosure, a density measurement of a Coriolis-type master meter having an accuracy of at least ±0.0002 g/cm$^3$, e.g., the flowmeters 12, 14 of the bank 10, may be used as the primary reference standard 30 with respect to DUT 16.

The primary reference standard 30 is selected to provide adequate capacity for calibrating the DUT 16 and each first meter 12 and second meter 14 of the plurality of banks 28 with an uncertainty of no more than 0.015% of the total flow measurement value. The primary reference standard 30, including the weigh scale 36, may be calibrated and periodically verified using a known mass. In at least one embodiment, the primary reference standard 30 has a full-scale range of 0-400 kg. In other embodiments, the range of the primary reference standard 30 may exceed 400 kg. The primary reference standard 30 may be capable of a flow range between about 0.5 L/s and about 10.0 L/s.

As shown in FIGS. 1 and 2, the calibration system 100 may include a measuring section 26 adapted to accept the DUT 16 and retain the DUT 16 in the flowpath 22 in fluid communication with the meter bank 18, pump module 48 and, selectively, the primary reference standard 30. In at least one embodiment, the measuring section 26 may include adapters connected to the flow lines of the flowpath 22 on either side or both sides of an opening in the flowpath 22 into which the DUT 16 may be introduced. Such adapters are configured to enable a physical, fluid-tight connection of the DUT 16 to the flowpath 22. The measuring section 26 may include a hydraulic unit configured to axially tighten the adapters and DUT 16, which may be fixed together with a hydraulic clamp. The measuring section 26 may further include a flow straighter or conditioner upstream of DUT 16 to at least approximately generate a swirl-free, symmetrical and repeatable flow profile through the DUT 16.

As shown in FIGS. 1 and 2, the calibration system 100 may include a reservoir 40, which contains the calibration fluid, for example, water or another fluid, which is pressurized in the flow lines of the flowpath 22 fluidically connecting the components of the system 100. In an embodiment, the calibration fluid may be pressurized in the flowpath 22 by a supply pump 49 disposed between the reservoir 40 and the flowpath 22. In at least one embodiment, the supply pump 49 may be a pressure-controlled zero-flow pump adapted to establish and maintain a desired system pressure in the flowpath 22. In certain embodiments, the flowpath 22 may be at least partially pressurized by action of gravity, where the reservoir 40 is located at a higher elevation than the remainder of the system 100.

The reservoir 40 may be selectively fluidically connected into the flowpath 22 via a supply valve 41 such that calibration fluid may selectively flow from the reservoir 40 and through the meter bank 18 and measuring section 26 at a desired pressure and rate. The pressure of the system may be further controlled by a system valve 46 between the reservoir 40 and the flowpath 22. The primary reference standard 30 may be selectively fluidically connected to the meter bank 18 and the pump module 48 via a diverter valve 44 disposed in the flowpath 22 downstream of the DUT 16. The diverter valve 44 may be at least a three-way valve adapted to be selectively switched quickly and precisely to enable the calibration system 100 to operate in either an open loop mode or a closed loop mode.

In the closed loop mode, as illustrated in FIG. 1, the diverter valve 44 is positioned such that under steady-state conditions the flowpath 22 includes the pump module 48, the meter bank 18 and the measuring section 26, including the DUT 16, and the flow of calibration fluid is directed through these components. In the closed loop mode, the primary reference standard 30 is not in the flowpath 22, and the calibration fluid does not flow into the primary reference standard 30.

In the open loop mode, as illustrated in FIG. 2, the diverter valve 44 is positioned such that under steady-state conditions the flowpath 22 includes the reservoir 40, the pump module 48, the meter bank 18, the measuring section 26, including the DUT 16, and the primary reference standard 30. In the open loop mode, calibration fluid is drawn from the reservoir 40 via the supply valve 41 and flows into the primary reference standard 30 where the mass of calibration fluid that flowed into the primary reference standard 30 during a defined measuring period can be measured using the weigh scale 36 and a mass flow rate thereby determined, in addition to other parameters of the flow. After measuring the mass, calibration fluid that has accumulated in the collection tank 32 can be drained and conveyed back to the reservoir 40 or to waste (e.g., such that the calibration fluid is not returned to the reservoir 40 and is not reused) via the drain 34.

In the open loop mode, the flow and system pressure within the flowpath 22 may be controlled by the system valve 46 in communication with the supply pump 49, and/or by the system valve 46 and the control valve 38, and at least one variable speed pump of the pump module 48. In the closed loop mode, the flow and system pressure within the flowpath 22 may be controlled by the pressure-controlled zero-flow pump 49. In such an embodiment, flow and pressure control of the flowpath 22 does not require the control valve 46.

In all embodiments, the calibration system 100 is configured to meet recognized international standards under International Organization for Standardization (ISO), the International Organization of Legal Metrology (OIML) and/or the International Laboratory Accreditation Cooperation (ILAC) organization or other such applicable industry standards. For example, embodiments of the present disclosure are configured to meet at least one of: OIML R19, OIML R76), ISO-17025, ISO-5168 and ILAC G8.

Figure 3:
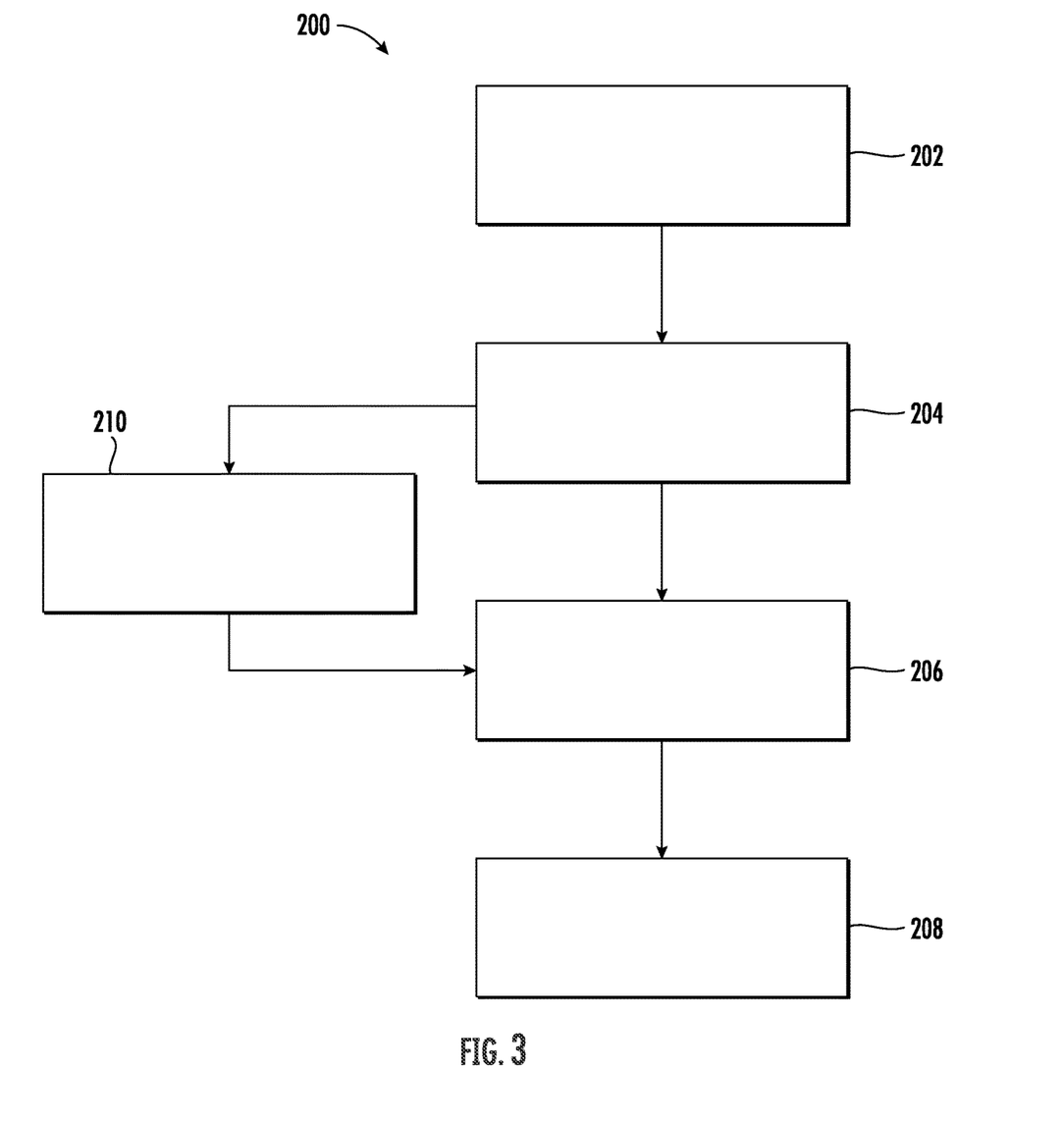
FIG. 3 shows a method of calibrating a device under test according to the present disclosure.

According to at least one embodiment of the present disclosure, the calibration system 100 may be configured to perform a method 200 for calibrating the DUT 16 as depicted in FIG. 3. The method 200 may include a step 202 of introducing the DUT 16 into the flowpath 22. For example, the DUT 16 may be inserted and connected into the measuring section 26 and thereby connected into the flowpath 22. The method 200 may include a step 204 of measuring values (e.g., a mass flow rate) from and comparing each of the first meter 12 and second meter 14 of one or more banks of the meter bank 18 against the primary reference standard 30. In at least one embodiment, the step 204 may employ a flying start-stop method known to those practiced in the art of flowmeter calibration.

In the context of the present disclosure, the flying start-stop method of the step 204 may include establishing a steady state flow of calibration fluid through the meter bank 18 and the measuring section 26, including the DUT 16, while bypassing the then-empty primary reference standard 30. At the start of the defined measuring period, a timer 52 is started, and simultaneously the diverter valve 44 is switched to the open loop mode, as described herein, in which the flow of calibration fluid is directed to the primary reference standard 30 and into the collection tank 32. At the end of the period, the diverter valve 44 is switched to the closed loop mode in which the primary reference standard 30 is bypassed, and simultaneously the timer 52 is stopped. The primary reference standard 30 may include the control valve 38 upstream of the collection tank 32 to further prevent calibration fluid from entering the collection tank 32 after the period.

During the period, a first flow rate of calibration fluid through the meter bank 18 is measured using both the first meter 12 and second meter 14, which may be an average of the separate flow rates measured by the first meter 12 and second meter 14, respectively. In embodiments including more than two meters in each bank, the first flow rate may be an average of the flow rates measured by all meters in a given bank. In configurations of the meter bank 18 in which more than the first bank 10 is selected, for example, the second bank 20 is also selected, the first flow rate is the sum total of the separate averaged flow rates measured through each selected bank, in this example, the first bank 10 and the second bank 20.

The period, measured by the timer 52, and the mass of calibration fluid that flowed into the primary reference standard 30 during the period, measured by the weigh scale 36, are used to determine and/or calculate a second flow rate into the primary reference standard 30. The first flow rate and the second flow rate are then compared to determine an accuracy of the first and second meters 12, 14. When the accuracy of the first meter 12 and/or the second meter 14 does not meet a maximum uncertainty requirement, the first meter 12 and/or the second meter 14 may be calibrated relative to the second flow rate determined from the primary reference standard 30. The maximum uncertainty requirement may be a requirement of an applicable industry standard as described herein. As a non-limiting example, the maximum uncertainty requirement may be no more than 0.0036 kg/s at an average flow rate through the system 100 of 12 kg/s. In at least one embodiment, the maximum uncertainty requirement may be no greater than 0.030% of the flow measurement value.

Having qualified (e.g., tested and/or calibrated) the first and second meters 12, 14 against the primary reference standard 30, the first and second meters 12, 14 are then qualified as master meters (e.g., secondary standards) and can be used to calibrate other meters, including the DUT 16. Qualifying the first and second meters 12, 14 may include test runs performed periodically against the primary reference standard 30 over a range of flow rates that encompasses a measuring range of each master meter bank with repeat measurements. Using the surrogate method described herein, the qualification is simplified by performing a measurement of the bank(s) of meters used for the calibration of the DUT 16 against the primary reference standard 30 before and after the calibration of the DUT 16. In such an embodiment, for example, to qualify the first and second meters 12, 14 the deviation difference between first and second comparisons must not exceed 0.015%. In certain embodiments, real-time Reynolds number monitoring may be performed to determine laminar and turbulent flow profiles and for flow rate compensation on technologies of specific DUTs 16 that are Reynolds number dependent.

The method 200 may include a step 206 of testing and/or calibrating the DUT 16 using the first and second meters 12, 14 (e.g., following the step 204, master meters 12, 14) of one or more banks of the meter bank 18. The step 206 may include establishing a steady state flow of calibration fluid through the meter bank 18 and the measuring section 26, including the DUT 16, while bypassing the primary reference standard 30 in the closed loop mode as described herein, and measuring a third flow rate using the DUT 16. The step 206 includes directly comparing and calibrating the DUT 16 by comparing the third flow rate against the first flow rate from the first and second mater meters 12, 14. When the accuracy of the DUT 16 does not meet a maximum uncertainty requirement for the specific DUT 16, the DUT 16 is calibrated relative to the first flow rate. In certain embodiments, the step 206 may include measuring an updated first flow rate through the meter bank 18 concurrent or near in time with measuring the third flow rate. In such an embodiment, the third flow rate is compared to the updated first flow rate to determine an accuracy of and/or calibrate the device under test.

The method 200 may further include a step 208 of repeating the step 204 of comparing each of the first meter 12 and second meter 14 of one or more banks of the meter bank 18 against the primary reference standard 30. The step 208 enables a higher overall measurement confidence to be established in the first meter 12 and second meter 14 of one or more banks of the meter bank 18 (e.g., in the secondary standard). In embodiments of the method 200 which include the steps 204, 206 and 208, the steps 204 and 208 bookend the calibration of the DUT 16 and thereby provide real-time assurance of the meter bank 18 as opposed to relying on master meter calibration intervals established for the first and second meters 12, 14. Because the measurement uncertainty determines the tolerance limit of the calibration of the DUT 16, the calibration system 100 and method 200 enable calibration of higher-level flow and prover technologies having maximum permissible error requirements less than or equal to ±0.1% of reading. Of course, the calibration system 100 and method 200 may be used to calibrate flowmeter technologies having maximum permissible error requirements greater than ±0.1% of reading as well.

In at least one embodiment, the method 200 may include a step 210 in which the DUT 16 may be tested and/or calibrated against the primary reference standard 30 during the step 204. In certain embodiments, the step 210 may include comparing a third flow rate measurement of the DUT 16 determined during the step 204 to the calculated second flow rate from the primary reference standard 30.

The defined measuring period may be selected to meet the required error and uncertainty requirements for a given DUT 16 and/or to certify the first and second meters 12, 14 as master meters. In at least one embodiment, the period may be 30 seconds. The period need not be the same for each run of the method 200.

The DUT 16 may be a single meter to be tested, evaluated or calibrated. Alternatively, the DUT 16 may be a plurality of similarly constructed meters connected in series in the measuring section 26 for simultaneous testing and calibration. In such an embodiment, flow measurement data from the meter bank 18 and the primary reference standard 30 may be used to calibrate each meter in the series within the DUT 16, thereby saving the time and expense of running separate volumes of calibration fluid through the system 100 for testing each meter separately. In embodiments of the present disclosure, the calibration system 100 is capable of testing and calibrating flowmeters from multiple equipment manufacturers and of sizes including at least from DN15 to DN300 (e.g., 0.5 in. to 12 in. line sizes). In further embodiments, the calibration system 100 is capable of testing and calibrating flowmeters of other sizes. The calibration system 100 is capable of testing and calibrating a wide variety of flowmeter technologies, including Coriolis mass flowmeters, electromagnetic flowmeters, ultrasonic flowmeters, vortex flowmeters, differential pressure measurement flowmeters and mechanical mass flowmeters.

The calibration system 100 may further include a control system 50 configured control the operation of the calibration system 100 to perform the method 200. In such an embodiment, the control system 50 may communicate with the meter bank 18, DUT 16 and/or primary reference standard 30 to receive and operate upon measurement signals representing measured values therefrom, including at least the first flow rate, and to determine the values of the second flow rate and the third flow rate. For example, the control system 50 may be configured to calculate the second flow rate, the accuracy of the first and second meters 12, 14 and the DUT 16, and the expanded uncertainty and confidence interval of the measured values. Such measured values may be communicated via wired or wireless signals. The control system 50 may further communicate with the pump module 48, the valves 42, the supply pump 49, the supply valve 41 and the diverter valve 44 to control and actuate each according to the method 200.

In certain embodiments, the control system 50 may include at least one flow computer configured to receive and operate upon measurement signals to determine the measured values therefrom. In further embodiments, the control system 50 may include a flow computer for each flowmeter of the calibration system 100 (e.g., each meter of the meter bank 18 and the DUT 16), which communicate with each other and/or with another computer to perform the method 200. For example, in certain embodiments, the transmitters of each flowmeter may include certain functions of the control system 50, which coordinates and controls each flowmeter.

The control system 50 enables automatic calibration cycles in which the method 200 may be performed without operator intervention at each step 202-210, and the calibration cycle of the method 200 can be easily programmed and changed by an operator. In an embodiment, the control system enables manual operation of the calibration system 100 by the operator in a manual mode.

In certain embodiments, the control system 50 forms a portion of a processing subsystem that includes one or more computing devices having memory, processing, and/or communication hardware. The control system 50 may be a single device or a distributed device, and the functions of the control system 50 may be performed by hardware and/or software. The control system 50 can include one or more Arithmetic Logic Units (ALUs), Central Processing Units (CPUs), memories, limiters, conditioners, filters, format converters, or the like which are not shown to preserve clarity. In one form, the control system 50 is programmable to execute algorithms and processes data in accordance with operating logic that is defined by programming instructions, such as software or firmware. Alternatively or additionally, operating logic for the control system 50 can be at least partially defined by hardwired logic or other hardware, for example, using an Application-Specific Integrated Circuit (ASIC) of any suitable type. The control system 50 may be exclusively dedicated to performing the method 200 or may be further used in the regulation, control, and activation of one or more other subsystems or aspects of the calibration system 100.

The control system 50 may include one or more modules structured to functionally execute the operations of the control system 50. The description herein including modules emphasizes the structural independence of the aspects of the control system 50 and illustrates one grouping of operations and responsibilities of the control system 50. Other groupings that execute similar overall operations are understood to be within the scope of the present application. Modules may be implemented in hardware and/or software on computer readable medium, and modules may be distributed across various hardware or software components.

In at least one embodiment, the control system 50 may include the timer 52 configured to measure the defined measuring period during which calibration fluid flows through the meter bank 18 and the DUT 16 and/or to the primary reference standard 30. The timer 52 may be a mechanical, electromagnetic or electronic clock or a clock generator. In certain embodiments, the clock 52 may be separate from but in communication with the control system 50.

In at least one embodiment, the calibration system 100 may include one or more pressure sensors 54 and temperature sensors 56 disposed at one or more locations and in communication with the flowpath 22. In the exemplary embodiments shown in FIGS. 1 and 2, the calibration system 100 may include two pressure sensors 54 and two temperature sensors 56, one each immediately upstream of the measuring section 26 and one each immediately downstream of the measuring section 26. The pressure sensors 54 and temperature sensors 56 may be in communication with the control system 50 to provide feedback to at least the pump module 48, the supply pump 49 and the control valve 46 regarding the system pressure in the flowpath 22 and to enable determination of volumetric flow rates and correction (e.g., Reynolds number correction) of the measurement signals from the flowmeters of the calibration system 100.

In at least one embodiment, the calibration system 100 may include a chiller 70 fluidically connected to the reservoir 40 and adapted to maintain a desired temperature of the calibration fluid therein. In certain embodiments, the calibration system 100 may include a heat exchanger 72 in thermal communication with the calibration fluid in the flowpath 22 and configured to maintain a desired temperature of the calibration fluid during operation. The heat exchanger 72 may be configured to drawn fluid from the reservoir 40 using a pump to regulate the temperature of the calibration fluid in the flowpath 22.

While various embodiments of a calibration system and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

The invention claimed is:

1. A method of calibrating a flowmeter device under test, the method comprising:
   establishing a steady state flow of a calibration fluid through a flowpath of a calibration rig comprising at least one bank of flowmeters including one or more flowmeters;
   switching the calibration rig to an open loop mode for a period, wherein in the open loop mode the flowpath includes a primary reference standard such that calibration fluid flowing through the at least one bank of flowmeters during the period flows into the primary standard;
   measuring a first flow rate of the calibration fluid through the at least one bank of flowmeters during the period;
   determining a second flow rate of the calibration fluid based on the mass of calibration fluid that flows into the primary reference standard during the period;

comparing the first flow rate and second flow rate to determine an accuracy of each flowmeter of the at least one bank of flowmeters;

when the accuracy of the one or more of the flowmeters of the at least one bank of flowmeters does not meet a first maximum uncertainty requirement, calibrating the one or more of the flowmeters relative to the second flow rate;

switching the calibration rig to a closed loop mode, wherein in the closed loop mode the flowpath includes the at least one bank of flowmeters and the device under test and does not include the primary reference standard such that calibration fluid flowing through the at least one bank of flowmeters and the device under test does not flow into the primary reference standard;

establishing a steady state flow of the calibration fluid through the flowpath of the closed loop mode;

measuring a third flow rate of the calibration fluid through the device under test;

comparing the first flow rate and the third flow rate to determine an accuracy of the device under test; and when the accuracy of the device under test does not meet a second maximum uncertainty requirement, calibrating the device under test relative to the first flow rate.

2. The method of claim 1, wherein:

concurrently or near in time with measuring the third flow rate, an updated first flow rate is measured through the at least one bank of flowmeters;

the third flow rate is compared to the updated first flow rate to determine an accuracy of the device under test; and when the accuracy of the device under test does not meet the second maximum uncertainty requirement, the device under test is calibrated relative to the updated first flow rate.

3. The method of claim 1, further comprising verifying the accuracy of the at least one bank of flowmeters, wherein the verifying comprises:

establishing a steady state flow of the calibration fluid through the flowpath in the closed loop mode;

switching the calibration rig to the open loop mode for a second period such that calibration fluid flowing through the at least one bank of flowmeters during the second period flows into the primary standard;

measuring a fourth flow rate of the calibration fluid through the at least one bank of flowmeters during the second period;

determining a fifth flow rate of the calibration fluid based on the mass of calibration fluid that flows into the primary reference standard during the second period;

comparing the fourth flow rate and fifth flow rate to determine an accuracy of each flowmeter of the at least one bank of flowmeters; and when the accuracy of the one or more of the flowmeters of the at least one bank of flowmeters does not meet the first maximum uncertainty requirement, recalibrating the one or more of the flowmeters relative to the fifth flow rate.

4. The method of claim 3, further comprising, when the one or more of the flowmeters are recalibrated relative to the fifth flow rate, verifying the accuracy of the device under test, wherein the verifying comprises:

establishing a steady state flow of the calibration fluid through the flowpath in the closed loop mode;

measuring a sixth flow rate of the calibration fluid through the device under test;

concurrently or near in time with measuring the sixth flow rate, an updated fourth flow rate is measured through the at least one bank of flowmeters;

the sixth flow rate is compared to the updated fourth flow rate to determine a new accuracy of the device under test; and when the new accuracy of the device under test does not meet the second maximum uncertainty requirement, the device under test is calibrated relative to the updated fourth flow rate.

5. The method of claim 1, further comprising installing the device under test into a measuring section of the calibration rig before or after measuring a first flow rate of the calibration fluid through the at least one bank of flowmeters during the period, wherein the measuring section is in the flowpath downstream of the at least one bank of flowmeters and upstream of the primary reference standard.

6. The method of claim 1, wherein the at least one bank of flowmeters includes a first flowmeter and a second flowmeter in series.

7. The method of claim 1, wherein the at least one bank of flowmeters includes plurality of banks, each in parallel with the others.

8. The method of claim 1, wherein the calibration rig includes a controller configured to perform the method, including:

to communicate with the at least one bank of flowmeters, device under test and/or primary reference standard to receive and operate upon measurement signals representing measured values therefrom; and to control a diverter valve by which the calibration rig is switched between the closed loop mode and the open loop mode.

9. The method of claim 1, wherein the calibration fluid is water.

* * * * *